May 2, 1972      T. R. CAMP      3,660,284
METHOD FOR WATER AND WASTEWATER TREATMENT
Filed April 9, 1970      2 Sheets-Sheet 1
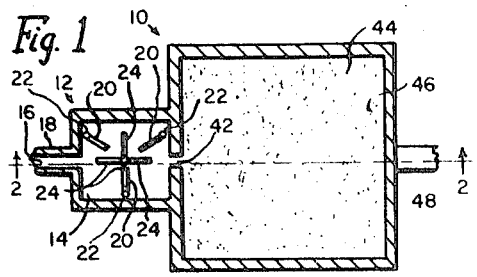
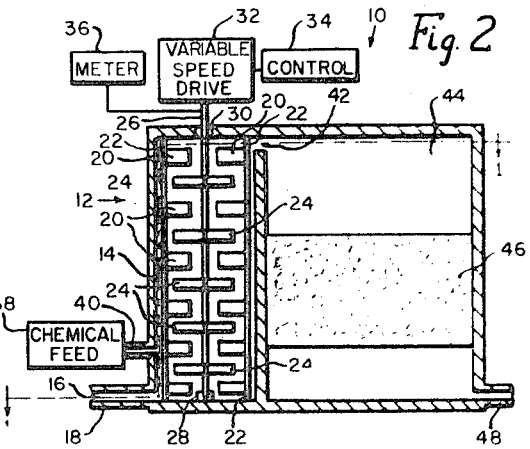
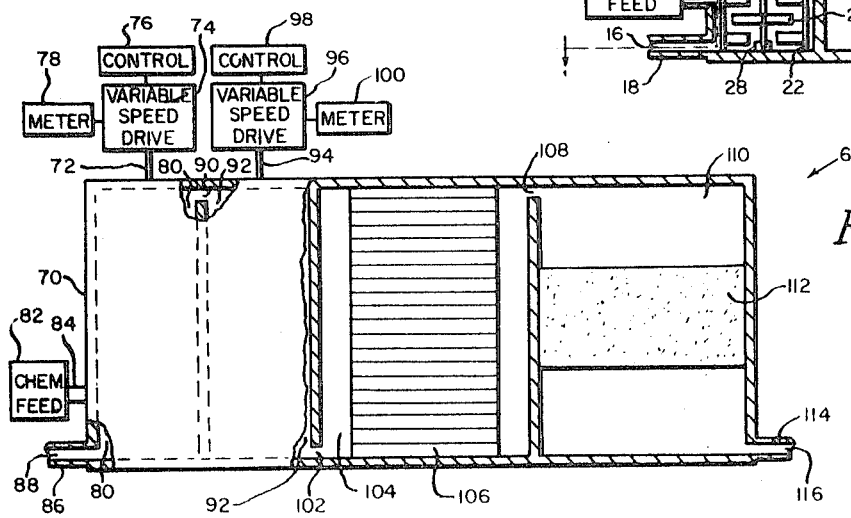
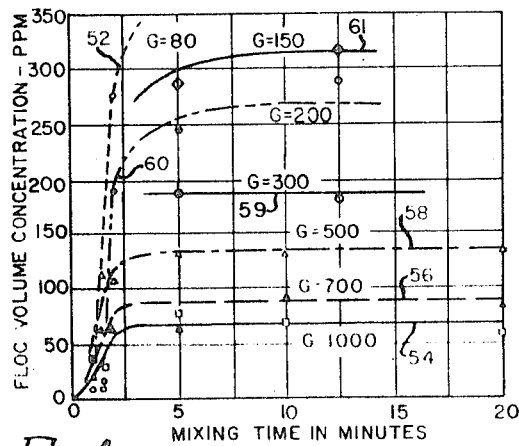
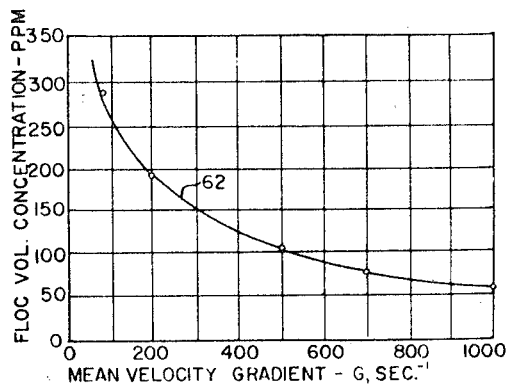
INVENTOR.
THOMAS R. CAMP
BY *Walter J. Kreske*
ATTORNEY

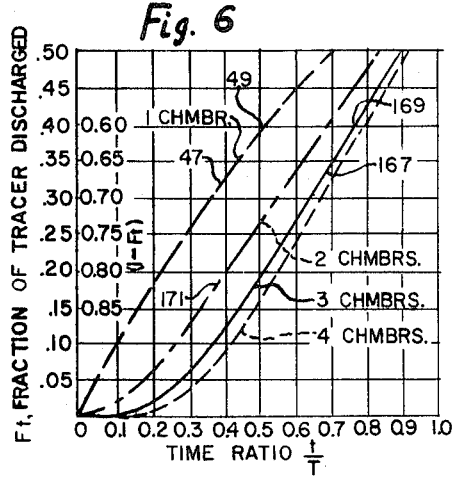
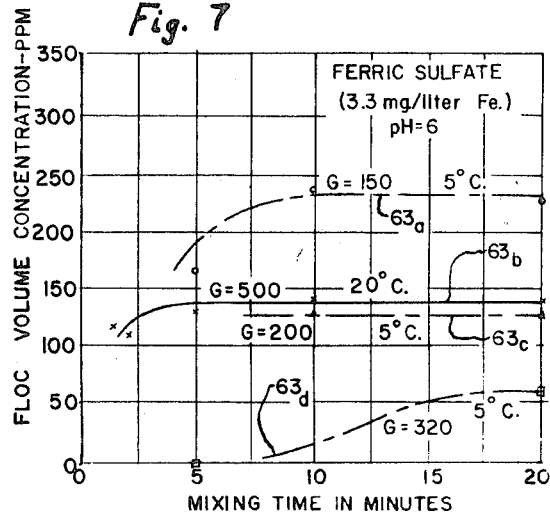
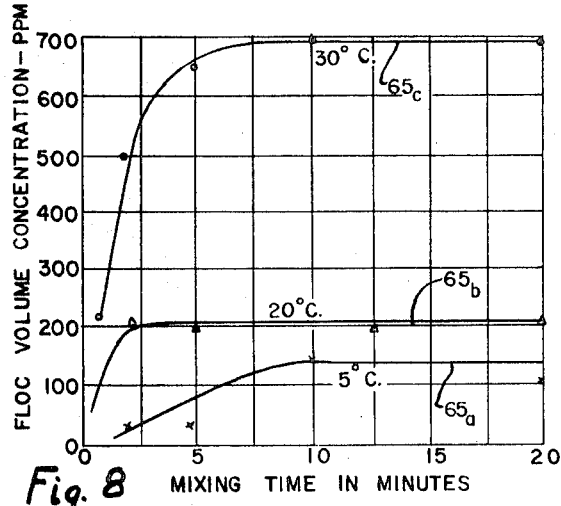
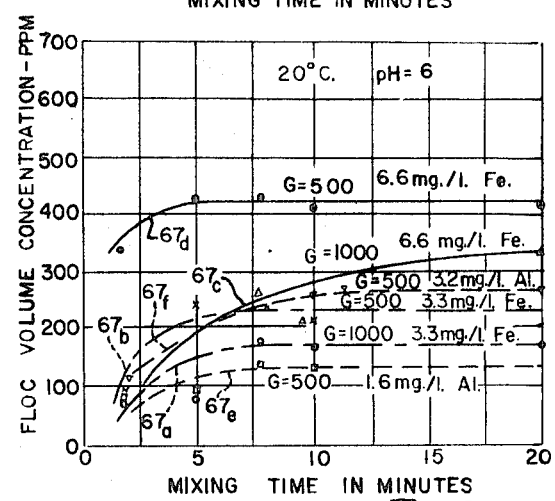
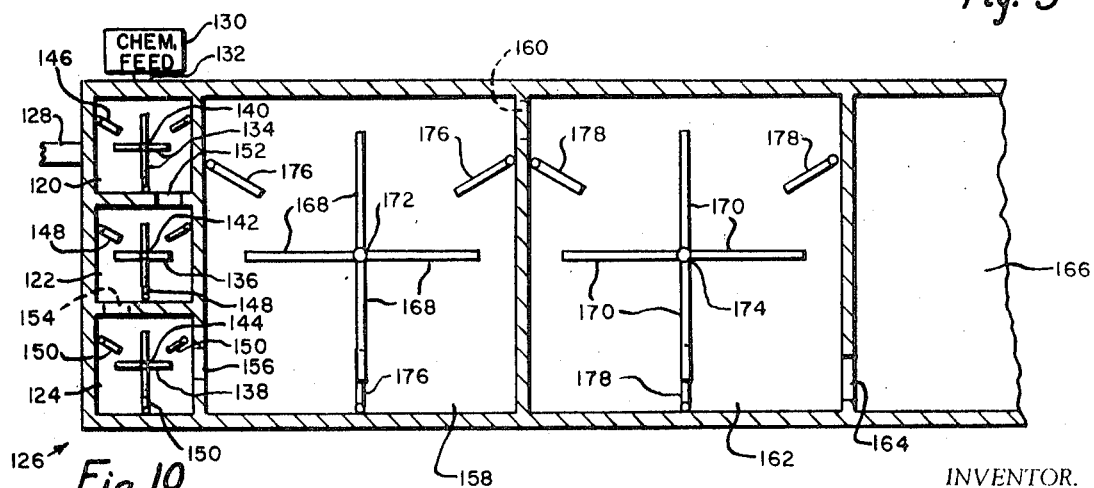

3,660,284
METHOD FOR WATER AND WASTEWATER TREATMENT

Thomas R. Camp, Boston, Mass., assignor of a fractional part interest to Walter J. Kreske, Newton Centre, Mass.
Continuation-in-part of abandoned application Ser. No. 828,552, May 28, 1969. This application Apr. 9, 1970, Ser. No. 26,954
Int. Cl. C02b 1/20
U.S. Cl. 210—49                              9 Claims

ABSTRACT OF THE DISCLOSURE

Increasing the efficiency of continuous flow water and wastewater treatment plants by mixing the water or wastewater with a floc forming chemical in a first mixing stage at a speed effecting a mean velocity gradient corresponding to a flow volume concentration less than 300 parts per million until flocculation is substantially complete and then either passing it through a rapid filter or alternatively mixing it in a second mixing stage at a lesser speed effecting a velocity gradient corresponding to a selected effluent floc volume concentration greater than 300 parts per million before passing on to subsequent treatment such as settling and filtering.

---

This is a continuation-in-part application of application Ser. No. 828,552, filed May 28, 1969, which has been abandoned in favor of this continuation-in-part application.

This invention relates to the improvement of operation of continuous flow water and wastewater treatment plants of the type having at least one mixing stage for mixing water or wastewater influent and a floc forming chemical dose by subjecting the water or wastewater influent and the floc forming chemical to a mixing speed in the mixing stage such that the mean velocity gradient G of the fluid corresponds to a floc volume concentration of a selected value less than 300 parts per million, and continuing the corresponding velocity gradient mixing speed until flocculation is substantially complete at the selected value before subjecting the so flocculated fluid to any substantially different floc volume concentration mixing speed. Mean velocity gradient as herein used is determined by the relation $$G=\sqrt{\frac{W}{\mu}}$$

where G is the mean velocity gradient per second, W is the power loss or dissipation per second per unit volume of the fluid being mixed, and $\mu$ is the absolute viscosity of the fluid mixture.

It has been heretofore believed that flocculation is a physical process requiring gentle turbulence and time. Previous experience in water treatment plants and sewage treatment plants showed that too violent mixing prevented the formation of floc particles that were large enough to settle out effectively. Therefore the mean velocity gradient G in flocculation basins of existing water treatment plants and sewage treatment plants have been generally maintained below a mean velocity gradient G of 74 per second and more often 20 to 40 per second. Within these low velocity gradients it became also generally recognized that the floc size increased as the velocity gradient was reduced, and many treatment plants used a plurality of compartments in tandem with each operating at a progressively lower velocity gradient. The inherent slowness of this process required relatively large and expensive plants when substantial volumes of fluids need treatment. Such slowness of treatment presents a serious economic problem in treating the current rapidly increasing volume need for treated water and wastewater.

In some instances a rapid initial mix of short duration has been used for increasing the rate of dispersion of chemical throughout the influent as it passed to the above mentioned tandem compartments. While the addition of such rapid initial mix has to a degree improved operating characteristics over previous practice, the inherent slowness of the overall process remained. Moreover, while increasing the rate of chemical dispersion has been the intended purpose of such brief initial mix, I have found that chemical dispersion is not the only phenomenon occurring despite the briefness of such initial mix period. For example, the chemical reactions also become nearly completed and flocculation is started. I have found that the G value at which these chemical reactions and flocculation occur, as well as duration of the period of this G value, are very important to achieving best efficiency in the water or wastewater treatment and will become more apparent as this description progresses.

In those instances seeking greater speed of treatment by passing the effluent from such initial rapid mix directly to a rapid filter without intermediate flocculation and settling, it has been found necessary to reduce the chemical dose to as low as half the customary concentration deemed necessary for adequate removal of impurities and to add filter aids such as polyacrylamide with inherent sacrifice in headloss at the filter in an effort to compensate for low chemical dose and prevent excessively rapid breakthrough of the filter. Also, seasonal changes in temperature of the fluid under treatment result in changes in operating efficiency of the system.

These problems have been greatly reduced and speed of fluid treatment capability substantially increased by the present invention which also incorporates other desirable features and advantages. Among these other features and advantages of the present invention is that of greatly increasing the speed of flocculation in a first stage, thereby reducing the volume of the chamber required. A further advantage is that of greatly reducing the time required for effecting substantially complete flocculation at a selected value of floc volume concentration. And another advantage is that of providing a capability for effecting in the first mixing stage suitable floc particle size and floc volume concentration for immediate filtration with superior length of filter run characteristics in a rapid filter even under conditions of a relatively high floc forming chemical dose. A still further advantage is that of effecting rapid and substantially complete flocculation of controlled floc particle size suitable for passing to a second stage for efficient further floc growth to substantially any desired floc size such as suitable for subsequent efficient settling treatment before filtering. And another advantage is that of providing a capability for compensating for flow and temperature changes and chemical concentration changes in the fluids under treatment in their affect on both floc size and settling rate to thereby achieve uniform overall plant operation regardless of flow, temperature and chemical concentration changes.

A primary object of the present invention is the provision of an improved method and means for substantially increasing the efficiency of water treatment plants and wastewater treatment plants.

A further object is the provision of a method and means for reducing the time required for complete flocculation to a selected floc size suitable for filtering in a rapid filter.

A still further object is the provision of a method and means for providing in a first mixing stage an inherent retardant to floc growth rate for a selected period at subsequent low mean velocity gradients.

And another object is the provision of a method and means for providing in a single mixing stage a floc of a controlled uniform range of floc particle size and floc volume concentration selectively suitable for filtering in a rapid filter directly from the mixing stage or alternatively suitable for further floc growth to another controlled uniform range of floc particle size and floc volume concentration in a subsequent stage.

And another object is the provision of a method and means for obtaining a preselected value of floc particle size and floc volume concentration even under conditions of change in flow and temperature or change in concentration of floc forming chemical dose.

These and other objects, features and advantages are achieved generally by providing in a water or wastewater treatment plant at least one mixing stage with capacity for subjecting the water or wastewater influent and a floc forming chemical dose to a mixing speed such that the mean velocity gradient G of the fluid being mixed corresponds to a floc volume concentration of a selected value less than 300 parts per million and continuing mixing at such corresponding mean velocity gradient until flocculation is substantially complete at the selected floc volume concentration before subjecting the so flocculated fluid to a mixing speed corresponding to a substantially different floc volume concentration.

It has been found that as the mean velocity gradient increases, at a given water temperature, from that corresponding to a mean floc volume concentration of about 300 parts per million, a progressively increasing time delay is achieved before substantial floc growth occurs at a subsequent lower mean velocity gradient such as is found during passage of the flocculated fluid to a filter or second mixing stage. This time delay may be even further increased by supplying the chemical dose to the water or wastewater only when the mean velocity gradient G is at a value corresponding to the selected floc volume concentration below the above mentioned 300 parts per million. Thereby the floc particle size, after leaving this single mixing stage will remain sufficiently small long enough for economic rapid filter runs directly from the single mixing stage even under relatively heavy chemical dose conditions.

Thus, by passing the so substantially completely flocculated fluid from the single mixing stage through a rapid filter, a highly efficient, high volume rate of water or wastewater treatment is thereby achieved.

Alternatively, by passing the substantially completely flocculated fluid to a second mixing stage with a mixing speed such that the mean velocity gradient corresponds to a floc volume concentration greater than 300 parts per million, further controlled growth to selected larger floc and floc volume concentration may thereby be effected in preparation for subsequent treatment such as settling and filtering.

Floc forming chemicals suitable for use in the present invention include, for example, alum, ferric sulfate and ferric chloride or a combination of them, with or without lime-soda softening. Chemical dosages contemplated are in the order of 6 to 50 parts per million of chemical to water or wastewater.

By providing at each mixing stage a chamber or two or more chambers in series with rotors and a variable speed drive coupled for rotation of the rotors, a relatively simple and easily operable arrangement for effecting mean velocity gradients corresponding to the selected floc volume concentration is thereby achieved.

By adding stators in operative relation to the rotors in a chamber, a relatively simple arrangement for greatly increasing the range of mean velocity gradients obtainable over similar rotational speeds with rotors alone is thereby achieved.

These and other features, objects and advantages will be better understood from the following description and accompanying drawings wherein:

Fig. 1 is a view taken on line 1—1 of FIG. 2 of a preferred embodiment of the invention with a one chamber single mixing stage;

FIG. 2 is a partially block and partially schematic diagram of the preferred embodiment of the invention with a one chamber single mixing stage and shown as a view on line 2—2 of FIG. 1.

FIG. 3 is a partially block and partially schematic diagram with cutaway portions showing an alternative embodiment of the invention with two mixing stages of one chamber each;

FIG. 4 is a graph illustrating the effect of G value and mixing time on floc volume concentration for assisting in the description of operation of the invention;

FIG. 5 is a graph illustrating the effect of G value on floc volume concentration after two minutes of mixing time for assisting in the description of operation of the invention;

FIG. 6 is a graph illustrating short circuiting effects of mixing tanks in tandem for assisting in the description of the construction and operation of the invention;

FIG. 7 is a graph illustrating the effect of temperature on floc volume concentration at various G values for assisting in the description of operation of the invention;

FIG. 8 is a graph illustrating the effect of temperature on floc volume concentration at a constant G value for assisting in the description of operation of the invention;

FIG. 9 is a graph illustrating the effect of chemical dose on floc volume concentration for assisting in the description of the invention; and FIG. 10 is a schematic diagram in plan view illustrating an alternative embodiment of the invention having a three chamber mixing stage.

ONE CHAMBER SINGLE MIXING STAGE EMBODIMENT

Referring to FIGS. 1 and 2 in more detail, a one chamber single mixing stage continuous flow water or wastewater treatment plant illustrative of the invention is designated generally by the numeral 10. The treatment plant 10 has a mixing stage 12 comprised of a single mixing chamber 14 arranged for receiving water on wastewater influent 16 through an inlet duct or pipe 18 at the bottom of the mixing chamber 14.

The mixing chamber 14 also contains a plurality of stators 20 which may be held in place by support rods 22 anchored at their ends to the top and bottom walls of the mixing chamber 14. The stators 20 extend inwardly toward the center of the mixing chamber 14 and straddle a plurality of paddle type mixing rotors fixed to a drive shaft 26 mounted in bearings 28 and 30 at the bottom and top walls of the mixing chamber 14 for rotation about the drive shaft axis which preferably coincides with the center or axis of the mixing chamber 14.

One end of the rotor shaft 26 is in driven engagement with a conventional variable speed drive 32 having a conventional control 34 for adjusting the rotational speed at which the variable speed drive 32 rotates the drive shaft 26. A suitable torque meter and tachometer 36 may also be provided at the rotor shaft 26 for indicating energy input to the rotor drive shaft 26 for determining mean velocity gradient in the mixing chamber 14 as will be hereinafter further described.

One or more conventional chemical feed devices such as the chemical feed device 38 are coupled through chemical feed pipes such as 40 to the mixing chamber 14 for supplying measured amounts of floc forming chemicals during the mixing process in accordance with the present invention. It is important to note that the chemical feed pipe 40 is connected for supplying floc forming chemicals directly to the mixing chamber 14 where the G value of fluid mixing is carefully maintained rather than to uncontrolled G value influent such as in the inlet duct 18 for reasons which will become more apparent as this description progresses.

An effluent opening 42 through the inner wall at the top of the mixing chamber 14 is provided for the passage of mixing chamber effluent to a filter chamber 44 having a rapid filter 46 through which the mixing chamber effluent must pass to reach a filtered effluent outlet duct or pipe 48 at the bottom of the filter chamber 44. A suitable rapid filter 46 may be comprised of a 20 inch depth of anthracite of 1 to 1.4 millimeter grain size, followed by a 20 inch depth of sand of 0.6 to 1 millimeter grain size. Also, other grain sizes and depths of anthracite and sand as well as other granular materials such as garnet and activated carbon may be used depending upon the rate of filtration, length of run, and quality of filter effluent desired. Experiments by applicant have shown that floc volume concentrations of up to 300 parts per million can be used on properly designed and operated rapid filters with very satisfactory effluents and long filter runs.

Inasmuch as the single mixing stage water or wastewater treatment plant 10 has a single mixing chamber or tank 14 with continuous flow of influent 16, it creates a problem of short circuiting of some of the influent 16 to the effluent opening 42 before the fluid is completely flocculated at the selected floc volume concentration. Such short circuiting may be measured experimentally by introducing a tracer such as a dye or a salt. The volume of the mixing chamber 14 is preferably proportioned with respect to the design volume rate of flow of the influent 16 such that at least 0.60 of the fluid is completely flocculated at the selected floc volume concentration. At lesser rates of flow of influent 16, more than 0.60 will be completely flocculated. The chamber 14 volume required may be computed by well known formulas for tracer curves, such as Equations 33, 34 and 35 of section 38, Handbook of Applied Hydraulics by Davis and Sorensen, 3rd edition, 1969, McGraw-Hill Book Co. The formulas have been plotted in FIG. 6 where the curve 47 shows the fraction of tracer $F_t$ discharged and the fraction retained $1-F_t$ with respect to the time ratio $t/T$ for a single mixing chamber such as the mixing chamber 14, where T is the time required for the rate of flow of influent 16 to effect a volume equal to the volume of the chamber 14, herein termed the retention time, and $t$ is the time duration of mixing in the chamber 14 commencing with the time of injection of the tracer slug into the mixing chamber 14. From the ordinate of the FIG. 6 graph, it is seen that the minimum design retention fraction 0.60 is identified as point 49 on the curve 47 and the corresponding time ratio $t/T$ is 0.51; and the design retention period T is $$\frac{1}{0.51}=1.96$$

times the time $t$ required for complete flocculation. It should be noted that the design volume is customarily that which would be encountered in peak load periods and that it is only during these peak load periods that the design retention fraction 0.60 might occur. Thus during normal operation the volume rate of influent 16 will be substantially less than at peak loads and the retention fraction $1-F_t$ will normally be much higher than the 0.60 mentioned above.

OPERATION OF THE ONE CHAMBER SINGLE MIXING STAGE EMBODIMENT

In the operation of the one chamber single mixing stage continuous flow water or wastewater treatment plant 10, floc forming chemicals are fed in continuously measured quantities from the chemical feed devices 38 to the mixing chamber 14 simultaneously with and in proportional relation to the rate of flow of influent water or wastewater 16 entering the mixing chamber 14 through the inlet pipe 18. The dose of floc forming chemical will depend upon the quality of water or waste water under treatment and will generally be in the order of 6 to 50 parts per million of chemical to water or wastewater.

During this flow of influent 16 and floc forming chemicals, the variable speed drive 32 is adjusted by the control 34 to effect a speed of rotation of the rotor shaft 26 and mixing rotors 24 to produce a selected value of mean velocity gradient G of fluid in the mixing chamber 14 which corresponds to a selected value of desired floc volume concentration as the mixing chamber effluent passes through the opening 42 to the filter chamber 44. If, for example, the floc forming chemical used is ferric sulfate at a concentration of 15 milligrams per liter of water, the corresponding value of mean velocity gradient G with the water temperature at 20 degrees centigrade for a selected floc volume concentration may be approximated from the curves in FIG. 4 which have been obtained under tests conceived by me and under my direction and plotted from actual laboratory measurements under controlled conditions of various mean velocity gradients. FIG. 4 is reproduced here from my report of my extensive laboratory work in this area and published in the June 1968 issue of the Journal American Water Works Association at pages 656 through 673, being vol. 60, No. 6 of that publication and is incorporated herein by reference. Supplementary data from subsequent experiments have also been added to FIG. 4.

Curve 62 of FIG. 5 was also plotted from laboratory measurements with respect to the above mentioned case of a ferric sulfate concentration of 15 milligrams per liter of water at two minutes mixing time and water at 20 degrees centigrade. It will be noted from FIG. 5 that floc volume concentration increases in that case very rapidly as the mean velocity gradient G falls below about 150 per second as noted by the rapid change in slope on the curve 62 as mean velocity gradient falls below 150. It will also be noted from the mean velocity gradient curves 54, 56, 58, 59, 60 and 61 in FIG. 4 for mean velocity gradients of 1000, 700, 500, 300, 200 and 150 respectively that each mean velocity gradient is characteristic of a particular floc volume concentration after flocculation is complete. Also, those curves show that the floc volume concentration becomes smaller as the mean velocity gradient is increased and remains substantially constant for a given mean velocity gradient regardless of passage of time. Thus the velocity gradient in the mixing chamber 14 may be used to produce and maintain a selected floc volume concentration for a given chemical dose and water temperature.

In FIG. 7, curves $63_a$, $63_b$, $63_c$, and $63_d$ show the effect of water temperature on floc volume concentration for the same 15 milligram per liter dose of ferric sulfate. It will be noted by curves $63_b$ and $63_c$ that as the temperature is lower, the G value must also be lowered to produce the same floc volume concentration. The curve $63_c$ shows that at 5 degrees centigrade, G must be about 200 to produce the same floc volume as was produced by a G of 500 at 20 degrees centigrade shown by curve $63_b$.

In FIG. 8, curves $65_a$, $65_b$, and $65_c$ show the effect of water temperature on floc volume concentration at temperatures of 5, 20 and 30 degrees centigrade respectively and holding G at 500, all with 15 milligrams per liter of ferric sulfate at pH 6.0.

In FIG. 9, curves $67_a$, $67_b$, $67_c$, and $67_d$ show the effect of chemical dose on floc volume concentration using ferric sulfate and curves $67_e$ and $67_f$ using alum, all at 20 degrees centigrade. Fifteen milligrams per liter of ferric sulfate contains 3.3 milligrams per liter of iron and is equivalent to an alum dose containing 1.6 milligrams per liter of aluminum. It will be noted that the floc volume concentration for each metal is approximately proportional to the metal concentration, but that aluminum produces less floc volume than iron.

The meter 36 may be arranged for combined torque and rotational speed measurement of the drive shaft 26 for determining the value of W in the mean velocity gradient formula $$G = \frac{W}{\mu}$$

by the relation:

$$W = \frac{2\pi s T}{V}$$

in which $s$ is the measured shaft 26 speed in revolutions per second, T is the measured torque in the input, V is the liquid volume in the mixing chamber 14, and $\mu$ is the absolute viscosity of the fluid in the mixing chamber 14. From these measurements suitable calibration curves showing mean velocity gradient for various water temperatures and rotational speeds of the rotor shaft 26 and thereby permit rapid and convenient adjustment at control 34 of mean velocity gradient to correspond with selected values of floc volume concentration.

Also, the floc volume concentration and floc size of the mixing chamber effluent at the opening 42 may be physically checked by actual particle count under a microscope and suitable reference grid and sampling tube such as explained at page 663 of the above mentioned Journal American Water Works Association publication.

EMBODIMENT WITH TWO SINGLE CHAMBER MIXING STAGES

In some instances it is desirable to provide floc particle size and floc volume concentration greater than that permissible for efficient operation of the FIG. 1 embodiment. For example, in instances requiring extended periods of treatment for disinfection, the present invention may advantageously involve a water or wastewater treatment plant having more than one controlled mixing stage. Such a treatment plant is designated by the numeral 68 in FIG. 3.

The continuous flow water or wastewater treatment plant 68 has a first single chamber mixing stage 70 with a drive shaft 72 extending into a mixing chamber 80 for driving a suitable mixing arrangement (not shown) which may, for example, be similar to the rotor 24 and stator 20 arrangement described above in connection with FIGS. 1 and 2 above. The drive shaft 72 is driven by means of a variable speed drive 74 with an adjustable speed control 76. A suitable meter 78 which may, for example, be similar to the meter 36 is coupled for determining the mean velocity gradient in the mixing chamber 80. Conventional chemical feed devices 82 feed floc forming chemicals through ducts or pipes 84 directly to the mixing chamber 80. An inlet duct or pipe 86 at the bottom of the mixing chamber 80 carries the continuously flowing water or wastewater influent 88 to the mixing chamber 80 for mixing with floc forming chemicals from the chemical feed devices 82 at selected floc volume concentrations below 300 parts per million.

A first mixing stage effluent opening 90 is provided at the top of the mixing chamber 80 to a second single chamber 92 mixing stage having therein a suitable fluid mixing arrangement (not shown) which may, for example, be similar to the rotor 24 and stator 20 arrangement described in connection with FIGS. 1 and 2 above. The rotor arrangement in the mixing chamber 92 is driven by a drive shaft 94 coupled to a suitable variable speed drive 96 with capacity for driving the shaft 94 at speeds for producing mean velocity gradients corresponding to floc volume concentrations in the effluent of mixing chamber 92 greater than 300 parts per million. The variable speed drive 96 has coupled to it a speed control 98 with capacity for varying speed of the shaft 94 in the above mentioned ranges of mean velocity gradient. A suitable meter 100 which may, for example, be similar to the meter 36 but with capacity for the lower power dissipation readings associated with the slower mixing speeds in the chamber 92, is coupled for determining the mean velocity gradient in the mixing chamber 92.

The mixing chamber 92 also has an opening 102 to a settling chamber 104 preferably of the type having horizontally disposed rapid floc settling tubes 106 and a settling effluent opening 108 to a filter chamber 110 with a rapid filter 112 which, for example, may be similar to the rapid filter 46. In some instances the rapid filter 112 may be omitted because sufficient purity of effluent is achieved without a filter. In those instances where the rapid filter 112 is used, it is in the path of settling tank effluent flow to an outlet duct or pipe 114 for the flow of filtered effluent 116.

OPERATION OF TWO MIXING STAGE EMBODIMENT

In the operation of the two mixing stage continuous flow water or wastewater treatment plant 68, the water or wastewater influent 88 through the inlet pipe 86 to the mixing chamber 80 is mixed with a floc forming chemical metered from the chemical feed device 82 at a velocity gradient corresponding to a selected floc volume concentration below 300 parts per million in manner similar to that described above in connection with mixing in the single stage 12 and similar chemicals may be used. As explained above with regard to mixing stage 12, the volume of mixing chamber 80 is proportioned with respect to the volume rate of flow of the influent, preferably with the aid of curve 47 in FIG. 6, for substantially complete flocculation at the selected mean floc volume concentration of the fluid passing through the opening 90 to the second mixing stage chamber 92.

In the second mixing stage chamber 92, the mean velocity gradient is maintained at a value corresponding to a selected floc volume concentration in the effluent greater than 300 parts per million. Thus there will be floc particle growth in the second stage mixing chamber 92. The volume of chamber 92 with respect to rate of influent flow at inlet 90 is preferably proportioned with the aid of curve 47 in FIG. 6 in manner explained above in regard to the single mixing stage 12 to effect a retention period for such particle growth in the mixing chamber 92 such that substantially all of the so flocculated fluid leaving the second mixing stage chamber 92 through the opening 102 will be at the selected floc volume concentration greater than 300 as it enters the settling chamber 104.

In the settling chamber 104, as the flocculated fluid passes through the horizontal settling tubes 106 which because of their relatively small settling distance capture most of the floc particles. Settling tank effluent passing through the opening 108 to the filter chamber 110 will therefor have been substantially deflocculated to a degree where remaining floc particles may be efficiently removed as the fluid passes through the rapid filter with minimum loading over long filter runs. The filtered fluid then passes through the outlet pipe 114 as filtered effluent 116.

THREE CHAMBER MIXING STAGE EMBODIMENT

In some instances, such as when there are limitations of space or convenience limitations on size of individual power units for mixing, the present invention contemplates embodiments with a plurality of series coupled mixing chambers in a single mixing stage. One such arrangement is shown in FIG. 10 where three mixing chambers 120, 122, and 124 are coupled in series to form a single mixing stage 126. An inlet pipe or duct 128 is coupled to the bottom of the mixing chamber 120 for feeding water or wastewater influent thereto. One or more well known chemical feed devices 130 with each coupled by a chemical feed pipe or duct 132 to the mixing chamber 120 provide floc forming chemicals in proper proportion to influent directly to the mixing chamber 120, preferably at a position sufficiently near the inlet pipe 128 for immediate contact with raw influent at the chamber 120 controlled G value of mixing.

Mixing in each of the chambers 120, 122 and 124 is performed by rotors 134, 136 and 138 mounted to drive shafts 140, 142 and 144 respectively. Each of the drive shafts 140, 142 and 144 is preferably driven by a variable speed drive with a speed control and meter such as the variable speed drive 32, control 34 and meter 36 described in connection with FIG. 2. The mixing arrangement in each of the chambers 120, 122 and 124 also preferably includes stators 146, 148 and 150 respectively.

Continuous fluid flow is permitted by providing an opening 152 in the top of the wall between the mixing chambers 120 and 122, another opening 154 in the bottom of the wall between the chambers 122 and 124, a further opening 156 in the top of the wall between the mixing chamber 124 and a further chamber 158, an additional opening 160 in the bottom of the wall between the chamber 158 and a chamber 162, together with an opening 164 in the top of the wall between chamber 162 and a chamber 166, only a portion of which appears in FIG. 10.

The volume of the chambers 120, 122 and 124 in the mixing stage 126 are proportioned with the aid of curve 167 in FIG. 6 for a design value rate of flow of influent such that there will be a retention factor of at least 0.60 which is represented by the point 169 on the curve 167. The point 169 represents a time ratio of 0.77 and a design retention period T of $$\frac{1}{0.77} = 1.3$$

as compared to the above mentioned design retention period of 1.96 for the single chamber single mixing stage 12. Thus the three chamber mixing stage 126 will require only about ⅔ the volume required for the single chamber stage 12. If only a two chamber mixing stake were used, as for example, the chambers 120 and 122, the two chamber curve 171 in FIG. 6 would apply and shows a retention time period T of $$\frac{1}{0.69} = 1.45$$

which means a volume of only about ¾ that required for the single chamber mixing stage 12.

The chambers 158 and 162 as shown in FIG. 10 form a second and third mixing stages, or alternatively a two-chamber second stage, with rotors 168 and 170 fixed to drive shafts 172 and 174 respectively and include stators 176 and 178. The drive shafts 172 and 174 are each preferably driven by a variable speed drive with speed control and meter such as the variable speed drive 32, control 34 and meter 36 described above.

The chamber 166 may be in the form of a conventional settling tank or contain rapid settling tubes such as settling tubes 106 followed by a suitable filter (not shown). Alternatively the invention contemplates that the multi-chamber mixing stage 126 may be followed directly by the chamber 166 which may be in the form of a rapid filter or settling tank depending on the nature of the fluid treatment involved. Also, for some purposes multi-chamber mixing stage 126 may be followed by chambers 158 and 166.

OPERATION OF THE THREE CHAMBER STAGE EMBODIMENT

In the operation of the FIG. 10 embodiment, the mixing speeds of the rotors 134, 136 and 138 in the chambers 120, 122 and 124 are all set for the same G value as that explained above for the mixing stage 12 and the mixing stage 70. The three mixing chambers 120, 122 and 124 will thus act in unison as a single mixing stage 126 for effecting the selected floc volume concentration in the fluid flowing to the next mixing stage 158. The mixing stage 158 will normally be operated at a lower G value such as described above in connection with the mixing chamber 92. From the mixing stage 158 the fluid passes to the third mixing stage 162 which normally operates at a still lower selected G value for further increasing the floc volume concentration before passing through the opening 164 to the settling tank 166. However, for some treatment purposes chamber 162 may be omitted, or chambers 158 and 162 may be operated as a two chamber stage at the same G value.

As explained above, the G value in any one or all of the mixing stages 126, 158 and 162 may be varied to compensate for changes in fluid temperature and floc forming chemical dose in accordance with graphs prepared in the laboratory on the water or wastewater to be treated as illustrated in FIGS. 4, 5, 7, 8 and 9. It should be noted that waters and wastewaters to be treated include turbidity color and other impurities which will affect the floc volume and size, whereas the illustrative graphs of FIGS. 4, 5, 7, 8 and 9 were prepared with Boston tap water.

It should also be noted that in all of the illustrative embodiments the chemical feed devices 38, 82 and 130 are arranged to feed floc forming chemicals directly to the respective mixing chambers 14, 80 and 120 whose mixing G values are carefully controlled at all times during operation. This is an important feature of the present invention because experiments indicate that the chemical reactions of the floc forming chemicals with the water or wastewater under treatment occur very rapidly as the chemicals are introduced and the G value of the fluid during this introductory period is important to effecting a fine dispersion size of crystalline structure at this critical period of the treatment process.

Further, it should be noted that in all of the above embodiments no mention has been made for cleaning the filters and the settling chambers after a filter run. It is intended that conventional means shall be used for such cleaning of the settling chambers and fluidizing of the filter beds and form no part of the present invention.

Additionally it should be noted that one of the important advantages of the present invention is the achievable reduction in capital cost of flocculation basins. For example, the current practice in the design of municipal water treatment plants is to provide sufficient capacity at the design flow for 30 to 45 minutes flocculation and an hour or more settling. The present invention will reduce the total time of flocculation to less than 20 minutes. And where as in FIG. 3 settling tubes are used, the total time of pretreatment after the coagulating chemicals are added will be only about 30 minutes. This is estimated to effect a reduction of volume of concrete in the pretreatment chambers to about one-fourth the volume currently needed, thus resulting in a very substantial capital saving in treatment plant, much more than enough to pay for the extra cost of the equipment described above as needed within the chambers and associated controls and servicing.

In most cases other than for softening plants it is cheaper and more effective to disinfect water for municipal use by adding chlorine at the entrance to the flocculation process. My invention contemplates a 30 minute minimum contact period which with breakpoint chlorination would be adequate to kill both viruses and bacteria. Also I believe that powdered activated carbon, for taste and odor removal, should be added as a first step (not shown) in the treatment process prior to the addition of the coagulating chemicals in a separate chamber which will provide about 5 minutes contact period with the raw water. It is preferable that powdered carbon should not be applied directly onto the filters because of the propensity to induce undesirable formation of mud balls. If the carbon is applied as a separate stage prior to the water entering my invention, the carbon will have done its work before being mixed with the coagulating chemicals described above and will be removed from the water by settling.

For industrial waters not requiring taste and odor removal or disinfection, my invention would permit single-stage flocculation direct to the filters such as in FIG. 1 without settling with waters of low turbidity and color. Longer pretreatment periods with settling such as achievable in FIGS. 3 and 10 would, of course, be required for highly turbid or highly colored raw waters.

This invention is not limited to the particular details of construction and operation disclosed as equivalents will suggest themselves to those skilled in the art.

What is claimed is:

1. In the treatment of water or waste water fluid, the method comprising:
   supplying said fluid and a floc forming chemical dose of about 6 to 50 parts per million of chemical from the chemical group consisting of alum, ferric sulfate, ferric chloride, both ferric sulfate and ferric chloride, to a mixing chamber in which is a mixing rotor;
   subjecting said supplied fluid and floc forming chemical dose to a mixing speed of said mixing rotor such that the mean velocity gradient G corresponds to a floc volume concentration of a selected value between about 50 and 300 parts per million where $$G = \sqrt{\frac{2\pi s T}{\mu V}}$$

with $\pi$ being the constant 3 1/7, $s$ being the rotor speed in revolutions per unit time, T being the mixing torque of the rotor, V being the volume of the fluid in the mixing chamber, and $\mu$ being the absolute viscosity of the fluid mixture;
   continuing the mixing of said supplied fluid and floc forming chemical dose at said corresponding G value until flocculation is substantially complete at the selected floc volume concentration before subjecting the so flocculated fluid to a substantially different floc volume concentration mixing speed.

2. The method as in claim 1 wherein a continuous flow of said fluid and floc forming chemical dose is maintained through said mixing chamber at a volume rate of flow such that the retention fraction of a tracer in the time required for said substantially complete flocculation is between 0.60 and 1.

3. The method as in claim 2 wherein said fluid from said mixing chamber is then passed to a rapid filter having a flow rate capacity such that the floc volume concentration remains substantially constant until the fluid reaches the rapid filter.

4. The method as in claim 2 wherein said fluid from said mixing chamber is then passed to another mixing chamber in which is another mixing rotor and subjected to a mixing speed of said other mixing rotor such that the mean velocity gradient G in said other mixing chamber corresponds to a floc volume concentration of a selected value substantially greater than 300 parts per million, and continuing the mixing at the selected greater floc volume concentration rate until the floc volume concentration leaving said last mentioned mixing chamber is approximately equal to said selected greater value.

5. The method as in claim 1 wherein said floc forming chemical and fluid are separately supplied to said mixing chamber and said floc forming chemical is supplied to said chamber while said mean velocity gradient of the fluid in said chamber substantially corresponds to the selected floc volume concentration.

6. The method as in claim 2 wherein said floc forming chemical dose and fluid are separately and continuously supplied to said mixing chamber while said mean velocity gradient of mixing in said chamber substantially corresponds to the selected floc volume concentration.

7. The method as in claim 4 wherein said fluid from said other mixing chamber is then passed through a settling chamber carrying a plurality of laterally disposed settling tubes.

8. The method as in claim 7 wherein said fluid from said settling chamber is then passed through a rapid filter.

9. In the treatment of water or waste water fluid, the method comprising:
   supplying said fluid and a floc forming chemical dose of about 6 to 50 parts per million of chemical from the chemical group consisting of alum, ferric sulfate, ferric chloride, both ferric sulfate and ferric chloride, separately and continuously to the first of a plurality of mixing chambers in tandem and in each of which is a mixing rotor;
   subjecting said supplied fluid and floc forming chemical dose as they pass through said plurality of tandem mixing chambers to a mixing speed of each of said mixing rotors such that the mean velocity gradient G in each of said plurality of mixing chambers corresponds to a floc volume concentration of a selected value between about 50 and 300 parts per million where $$G = \sqrt{\frac{2\pi s T}{\mu V}}$$

with $\pi$ being the constant 3 1/7, $s$ being the rotor speed per unit time in each of the plurality of said chambers, T being the mixing torque of the rotor in the respective mixing chamber, V being the volume of the fluid in the respective mixing chamber, and $\mu$ being the absolute viscosity of the fluid mixture in the the associated mixing chamber;
   maintaining a volume rate of flow of said fluid and floc forming chemical dose through said plurality of tandem mixing chambers such that the retention fraction of a tracer from said first mixing chamber leaving the last of said plurality of mixing chambers is between 0.60 and 1.

References Cited

UNITED STATES PATENTS

| 1,605,596 | 11/1926 | Langelier | 210—49 |
| 2,382,490 | 8/1945 | Lawlor | 210—208 X |
| 3,170,868 | 2/1965 | Atkinson | 210—49 |

OTHER REFERENCES

Camp, T. R., Theory of Water Filtration, J. San. Eng. Div., ASCE, 90:1, August 1964, pp. 2 and 11.

REUBEN FRIEDMAN, Primary Examiner

T. G. WYSE, Assistant Examiner